April 23, 1946.   H. ST PIERRE   2,398,897
DETACHABLE CHAIN LINK
Filed Feb. 15, 1943
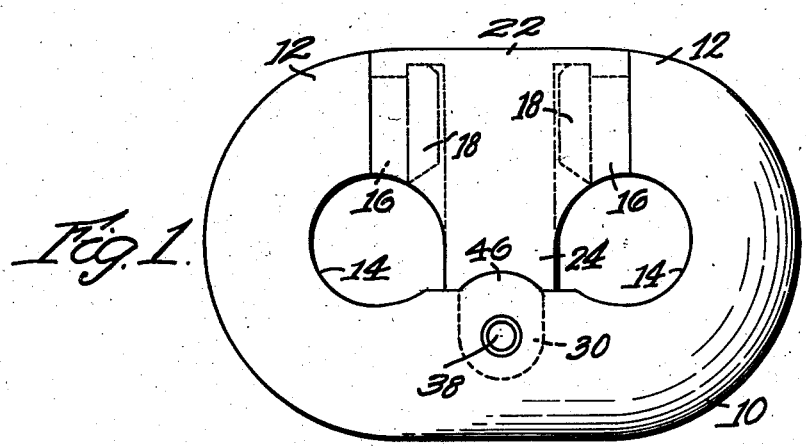
Fig. 1.
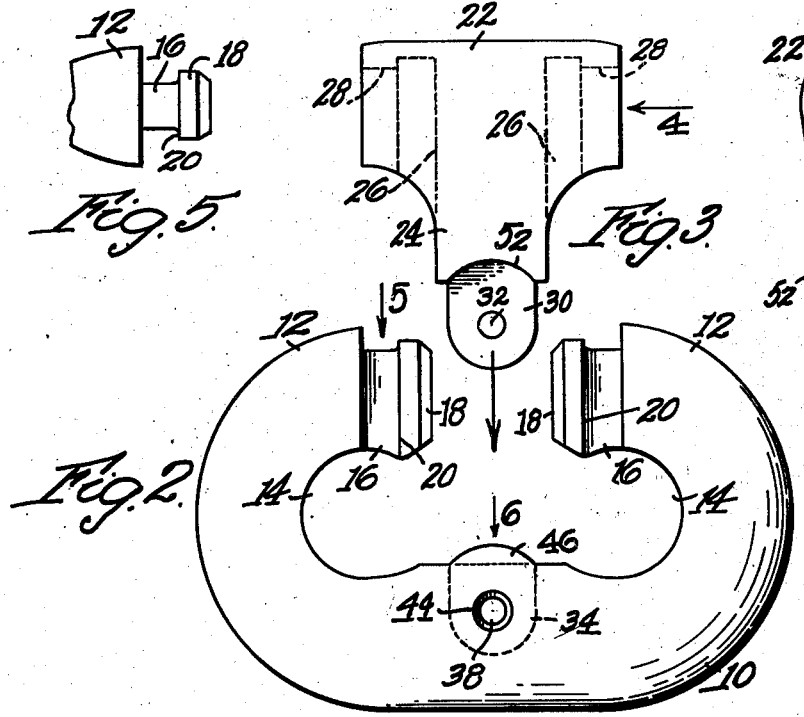
Fig. 5.   Fig. 3.   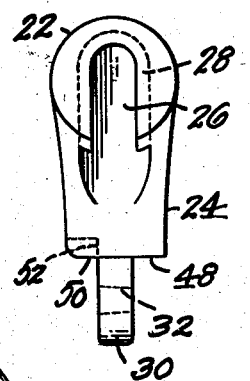 Fig. 4.
Fig. 2.
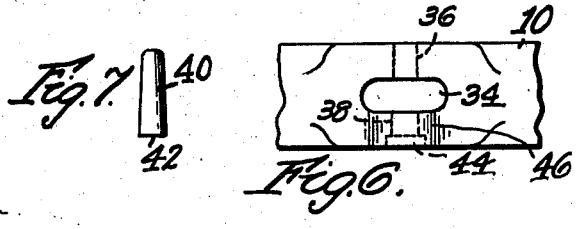
Fig. 7.   Fig. 6.
Inventor
Henry St. Pierre
By attorney
Charles R. Fay Patented Apr. 23, 1946

2,398,897

UNITED STATES PATENT OFFICE 2,398,897

DETACHABLE CHAIN LINK

Henry St. Pierre, Worcester, Mass.

Application February 15, 1943, Serial No. 475,898

5 Claims. (Cl. 59—85)

This invention relates to new and improved detachable chain links particularly adapted for heavy duty use.

Objects of the invention include the provision of a detachable chain link comprising a C-shaped member forged in one piece and having shouldered connection elements facing each other at the ends of the C, and a single one-piece forged T-shaped coupling member having undercut recesses in which the shouldered connection elements are receivable to close the open side of the C-shaped member, the leg of the T-shaped member providing a stud for the link and being securable to the closed side of the C-shaped member by a special construction.

Other objects of the invention include the provision of a novel and simplified detachable locking link for chains comprising a main C-shaped member having an open side between the ends of the C, and a T-shaped member forming a stud and being provided with a reduced boss for insertion in a corresponding recess in the closed side of the C-shaped member, there being a tapered aperture in the C-shaped member, said aperture lying on an axis traversing the recess and adapted to receive a tapered pin, the tapered pin passing through a correspondingly tapered aperture in the boss, there being a raised portion or protuberance on either member for engagement with a corresponding depression in the other member, whereby the two members may be assembled in one relative position only, to insure the correct mating of the tapered apertures in the C-shaped member and in the boss to receive a tapered pin to secure the members together thus completing the link.

Other objects and advantages will appear hereinafter.

Reference is to be had to the accompanying drawing in which

Fig. 1 is a view of a completed link according to the invention;

Fig. 2 is a view of the main C-shaped member;

Fig. 3 is a view of the T-shaped closing member;

Fig. 4 is a view in side elevation of the T-shaped member and looking in the direction of arrow 4 in Fig. 3;

Fig. 5 is an edge view of one of the shoulder connection elements of the main member looking in the direction of arrow 5 in Fig. 2;

Fig. 6 is an edge view of the interior aspect of the closed side of the main member and looking in the direction of arrow 6 in Fig. 2; and Fig. 7 shows the tapered locking pin.

The main part of the link is indicated in the drawing at 10 and comprises a forged one-piece C-shaped main member of iron or steel or an alloy. This C-shaped member is provided with reversely curved ends 12 which provide eyes 14 and terminate in reduced necks 16. Enlarged heads 18 are provided on the necks, and these heads in turn provide locking shoulders 20. Necks 16, heads 18, and shoulders 20 are generally elongated and narrow, and are parallel sided for a purpose to be described.

In Figs. 3 and 4 there is disclosed a T-shaped secondary member 22 having a leg 24, the latter forming a stud for the link as shown in Fig. 1. At each side of the stud in the head of the T-shaped member there are provided parallel sided recesses 26 which are undercut as shown at 28 for the purpose of receiving the neck 16 and heads 18 of the main C-shaped member. As is indicated by the arrow in Fig. 3, T-shaped member 22 is adapted to be slid in the direction indicated so as to close the C-shaped member to form the completed link seen in Fig. 1. By reason of the fact that necks 16 and heads 18 are parallel sided in a direction transverse of the link but parallel to the main plane thereof, it will be seen that the only way for the T-shaped member to be assembled on the C-shaped member to close the open side of the latter is by sliding the T-shaped member in the direction shown by the arrow in Fig. 3. When the link is thus assembled, the only way in which it can be taken apart is to reverse the process by sliding the T-shaped member rectilinearly outwardly from the C-shaped member. As seen in Figure 3 the T-shaped member is symmetrical about the transverse plane of the link. Also, as seen in Figure 1, the T-shaped member has an exterior surface conforming in contour to the corresponding exterior surface on the closed side of the link.

The leg 24 of the T-shaped member terminates in a reduced rounded boss 30, this boss having a tapered aperture 32 passing therethrough. At the closed side of the C-shaped member 10 there is a recess 34 centrally located therein, this recess being complementary in shape to the boss 30. At the sides of recess 34 there are tapered apertures 36, 38, it being seen in Fig. 6 that these apertures are different in diameter, aperture 36 being smaller than the other. Nevertheless the walls of these apertures are along the same lines and are located on an axis passing directly through recess 34.

When the T-shaped closing member has been set in place with boss 30 entering recess 34, the apertures 32, 36 and 38 will be aligned to form in effect a single tapered aperture passing completely through the link. A tapered pin 40 may then be entered through the combined aperture to lock the link parts together. It is preferred to provide a tapered pin which is shorter in length than the above described combined aperture so that the end 42 of the pin will underlie the outer surface of the C-shaped member. A counterbore is provided at 44 and this counterbore is adapted to be plugged with lead so as to prevent accidental dislodgement of the pin and entry of dirt or water.

At the closed side of the C-shaped member there is provided a raised portion or protuberance 46, this protuberance being located adjacent to but at one side only of recess 34, see Fig. 6. The reduction of boss 30 relative to leg 24 of the T-shaped member provides a pair of shoulders 48, 50, and in one only of these shoulders there is provided a depression 52 complementary to protuberance 46. In the particular illustration of the invention as here disclosed the depression 52 is located adjacent the wider end of aperture 32 in boss 30 and the protuberance 46 is located in the area of the aperture 38 in the main member 10, aperture 38 being the larger one of the two apertures in this member.

By reason of the interfitting protuberance and depression it will be seen that the T-shaped closing member may be assembled to the main C-shaped member in but one position so that the tapering apertures 32, 36, 38 are bound to correspond to form a single continuous surface to receive the tapered pin 40. It is to be noted that the tapered pin lock need not be particularly strong inasmuch as all stress on a chain including the present detachable link will occur in directions tending to pull the ends 12 of the main link apart from each other, and this strain is taken up by the T-shaped closing member by reason of heads 18 and recesses 26. There will never be any tendency for the T-shaped member to pull away from the main member, in fact stresses on the chain will tend to compress the stud, and pin 40 is provided merely to maintain the link parts in assembled condition. It will also be seen that to disassemble the link it is merely necessary to remove the lead plug at 44 and to press out the tapered pin from its small end; and therefore it will be seen that this invention provides a simple but effective detachable locking link for heavy chains, this link being relatively easy to manufacture and yet efficient in operation.

Having thus described my invention and the advantages thereof, I do not wish to be limited to the details herein disclosed, otherwise than as set forth in the claims, but what I claim is:

1. A detachable chain link comprising a main generally C-shaped member having a closed side, and an open side between the ends of the C, a generally T-shaped member for closing the open side of the C, said T-shaped member having an exterior surface conforming to the closed side of the link and having a leg forming a stud for the link, complementary means on the members for locking the same against relative movement except in one straight direction, interfitting means providing for assembly of said members in one relative position only thereof, and a taper pin intersecting both members to lock the same together against relative disassembly in said direction.

2. A detachable chain link as recited in claim 1, wherein said stud is provided with means intersecting a part of the main member, said taper pin passing through said last named means and said main member, and said interfitting means being located at one side only of the stud.

3. A detachable chain link comprising a main member having a closed side and an open side, a secondary member to close said open side, said secondary member having an exterior surface conforming in shape to the closed side of the link, complementary locking shoulders on said members, said shoulders having parallel sides to afford assembly of the members by a single straight sliding motion, complementary interengaging means on said members whereby the latter may be assembled in a single relation only, interfitting means on said members, and said interfitting means having a tapered aperture for reception of a taper pin.

4. A detachable chain link comprising a main member having a closed side and an open side, a secondary member for closing said side, said secondary member having an exterior surface conforming in shape to the closed side of the link, one member having a recess and in element fitting the recess on the other member, the main member having a tapered aperture intersecting the recess, said element having a tapered aperture, said apertures aligning to form a continuous tapered passage in only one relative position of said members and interfitting means effective to ensure correct assembly of the members in said one relative position.

5. A detachable chain link comprising a main member having means forming a closed side, ends, and an open side; a secondary symmetrical member for closing the open side, stud-forming means on said secondary member, one of said means having a recess therein, a boss on the other means adapted to enter the recess, interfitting parts on said members at corresponding sides thereof to ensure assembly of the members in a single relation, the boss and an area intersecting the recess having tapered apertures therein, said apertures mating to form a single tapered passage only when the members are assembled in said single relation, said passage being adapted to receive a taper pin.

HENRY ST. PIERRE.